United States Patent
Danforth et al.

(10) Patent No.: US 9,444,782 B2
(45) Date of Patent: *Sep. 13, 2016

(54) SYSTEM AND METHOD FOR ASSIGNING A SERVICE FLOW CLASSIFIER TO A DEVICE

(71) Applicant: Time Warner Cable Enterprises LLC, New York, NY (US)

(72) Inventors: Andrew Charles Danforth, Chantilly, VA (US); Tushar A. Nakhre, Herndon, VA (US); Clayton O'Neill, Centreville, VA (US)

(73) Assignee: TIME WARNER CABLE ENTERPRISES, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,141

(22) Filed: Dec. 28, 2015

(65) Prior Publication Data

US 2016/0119280 A1    Apr. 28, 2016

Related U.S. Application Data (63) Continuation of application No. 13/074,634, filed on Mar. 29, 2011, now Pat. No. 9,270,472.

(51) Int. Cl.
| | |
|---|---|
| *G06F 15/16* | (2006.01) |
| *H04L 29/12* | (2006.01) |
| *H04L 12/24* | (2006.01) |
| *H04L 12/14* | (2006.01) |
| *H04L 29/08* | (2006.01) |
| *H04L 12/851* | (2013.01) |

(52) U.S. Cl.
CPC ....... *H04L 61/2015* (2013.01); *H04L 12/1485* (2013.01); *H04L 41/0806* (2013.01); *H04L 61/6022* (2013.01); *H04L 67/06* (2013.01); *H04L 67/10* (2013.01); *H04L 47/2441* (2013.01)

(58) Field of Classification Search
CPC ................. H04L 47/2483; H04L 47/2441
USPC ..................................................... 709/234
See application file for complete search history.

(56) References Cited

U.S. PATENT DOCUMENTS

| | | | |
|---|---|---|---|
| 7,558,872 B1 * | 7/2009 | Senevirathne | H04L 47/10 370/231 |
| 7,765,312 B2 * | 7/2010 | Monette | H04L 47/10 709/224 |
| 8,891,372 B2 * | 11/2014 | Garofalo | H04L 12/5693 370/229 |
| 8,954,535 B2 * | 2/2015 | Rijsman | H04L 47/2408 370/230 |
| 2005/0015810 A1 | 1/2005 | Gould et al. | |
| 2005/0254419 A1 | 11/2005 | Barker et al. | |
| 2006/0206597 A1 | 9/2006 | Kim et al. | |
| 2007/0058677 A1 | 3/2007 | Kwon et al. | |
| 2009/0198804 A1 | 8/2009 | Danforth et al. | |

* cited by examiner

*Primary Examiner* — Phuoc Nguyen
(74) *Attorney, Agent, or Firm* — The Marbury Law Group, PLLC (57) ABSTRACT

A system and method for assigning a service flow classifier to a device. A MAC address of a device is extracted from a DHCP discover message. A DHCP server constructs a key from the device MAC address and an IP address assigned by the DHCP server. The key identifies a record of attributes of the device. A configuration server uses the key to access the attribute record and to generate a boot file for the device. The boot file includes one or more service flow classifiers that determine a service flow for packets destined for the device.

32 Claims, 5 Drawing Sheets

SYSTEM AND METHOD FOR ASSIGNING A SERVICE FLOW CLASSIFIER TO A DEVICE

This application is a continuation application of U.S. patent application Ser. No. 13/074,634 filed on Mar. 29, 2011, entitled "System and Method for Assigning a Service Flow Classifier to a Device," which herein incorporated by reference in its entirety.

BACKGROUND

Service provider networks, such as, for example, cable networks, fiber networks, fiber to the home networks, provide a wide range of services to subscribers for a fee. The services provided over a service provider network may include voice, data and video and may be offered in "levels" that are differentiated by speed, bandwidth, price, and quality-of-service (QoS) to name a few. A service level may include a maximum usage threshold. Policies, such as bandwidth throttling and QoS reduction, may also be implemented based on usage. Alternatively, services may also be offered on a consumption based billing (CBB) model in which subscribers pay for the service they use.

Service offerings, policies and billing models that are based on consumption necessarily require a service provider to measure consumption. It is in the interest of subscribers of such service offerings that the consumption that is being measured is accurate and does not include traffic that is originated by the service provider or the network itself or that is not usable by the subscriber. By way of illustration and not by way of limitation, polling messages sent to devices and IP renew message exchanges between customer devices and network devices are examples of traffic that a subscriber may want excluded from his or her measured consumption. Additionally, a subscriber would not want to be accountable for consumption that is caused by plant problems that does not result in subscriber usable traffic.

Several sources are available to measure consumption, but each has its limitations for accuracy. For instance, when using standard service flows without any classifiers, all traffic to and from a cable modem and its customer devices is counted regardless of whether it is generated by the subscriber or not. This can be alleviated with the use of IP based classifiers, but they are not static and may change rendering the classification ineffective. Traffic received by and sent from a cable modem may also be counted directly from the cable modem's counters. However, the cable modem counters do not differentiate traffic between source and destination addresses and can only provide aggregate traffic counts across an interface. Furthermore, the cable modem is not considered a trusted device or may be unreachable at times, hence compromising the accuracy of the data. The cable modem termination server (CMTS) is another source for measuring traffic. One approach to obtaining packet counts from the CMTS is to poll specific simple network management protocol (SNMP) management information bases (MIBs). Polling the CMTS, however, is not desired because it is CPU intensive and is not designed to scale polling large tables. The CMTS also requires constant polling to track any dynamic service flows which can affect the accuracy of the counts. IPDR (Internet Protocol Detail Records) records from the CMTS provides a means to access the same MIBs without polling, but the problem of being able to separate and count customer and management traffic reliably and accurately still remains.

To satisfy both the service provider and its subscribers, the means by which consumption is measured must be capable of distinguishing "countable" traffic from "non-countable" traffic.

Figure 1:
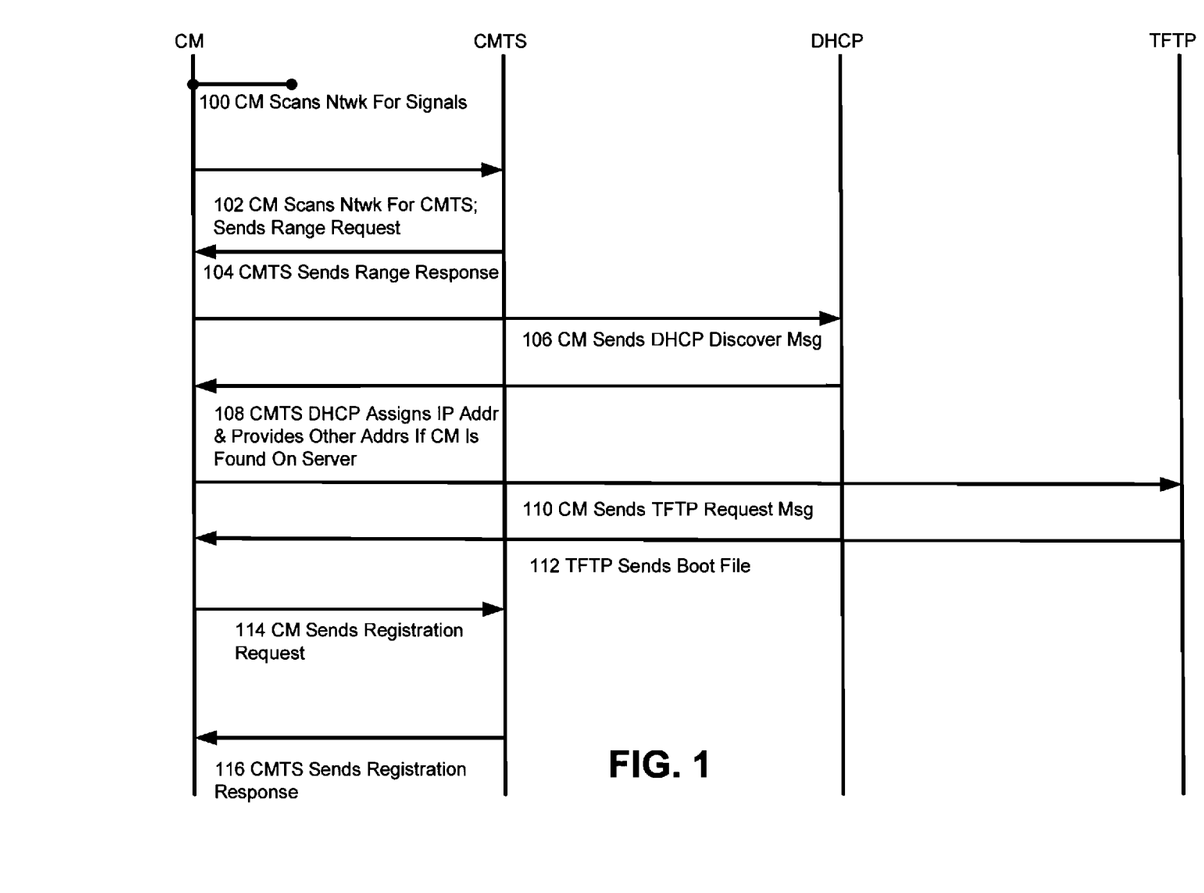
FIG. 1 is a block diagram illustrating a typical provisioning process.

A service provider may want to measure consumption for reasons unrelated to billing and to distinguish one traffic type from another. Consumption data may be used to reconfigure a network or to target services to subscribers sharing particular interests. The service level available to a subscriber is typically managed during the provisioning of devices used by subscribers to access the service provider network. A typical provisioning process for a cable modem is illustrated in FIG. 1. However, the process is not limited to cable modems and is used by other network devices that are configured on boot-up.

When a subscriber powers up the cable modem, it scans the downstream looking for 64- or 256-QAM (quadrature amplitude modulation) digitally modulated signals (line 100). Once a digital signal is found, the modem looks for information on that signal that is sent by the cable modem termination system (CMTS) (line 200). The cable modem acquires an upstream channel descriptor (UCD), which contains information that the cable modem will need, such as the upstream frequency, modulation type and channel bandwidth to use in order to communicate with the CMTS.

The cable modem then sends a range request (line 102). When the CMTS detects the range request, it analyzes the power, frequency and timing of the range request and sends the cable modem a range response (line 104), which includes instructions for the modem to adjust its transmit power, frequency and timing as necessary.

When the cable modem has ranged with the CMTS, it has established a communications link. The cable modem then needs to obtain additional information about the network, get an IP address and get the name of a configuration file. The cable modem sends a Dynamic Host Configuration Protocol (DHCP) discover message to a DHCP server connected to the IP network attached to the network (line 106). If the cable modem has been provisioned on the server, the DHCP server will send the modem an IP address, the IP address of a configuration file server (sometimes referred to herein as a "Trivial File Transfer Protocol" or "TFTP" server) and a configuration filename (line 108).

The cable modem downloads the configuration file whose name it was given during the DHCP process. It does this by sending a TFTP read request (line 110) to the IP address of the TFTP server, also obtained during the DHCP process. If the filename exists on the TFTP server, the file is downloaded to the cable modem (line 112). This file will provide the cable modem with settings such as the maximum subscriber data download and upload speeds, and quality of service (QoS) settings. The cable modem then sends a registration request to the CMTS along with a list of the modem's configuration settings (line 114). If the CMTS approves of the modem's settings, it will respond with a registration response indicating a successful registration (line 116). If the CMTS does not like the cable modem's settings, the CMTS has the ability to reject the cable modem with a registration rejection, and the cable modem will not be able to come online and transmit data.

Configuration files (also referred to as "boot files") may be dynamically generated based on information provided in a configuration request message. In dynamic configuration (sometime referred to herein as "Dynamic TFTP" or "DTFTP"), the DHCP server provides a template identifier and device attributes in the response message sent to the cable modem. The cable modem provides the template identifier and device attributes to a DTFTP server, which generates a boot file for the cable modem. (See commonly owned U.S. Pat. No. 7,293,282, which patent is incorporated herein by reference for a more detailed description of the dynamic generation of boot files.)

Service flows (SFs) are the fundamental units in DOCSIS 1.1 or higher protocols used to carry upstream (US) and downstream (DS) traffic to and from the CM. A service flow is a unidirectional flow of packets for which a particular Quality of Service (QoS) policy is applied. The CMTS, in the downstream, or the CM, in the upstream, enforces this policy through a combination of traffic shaping, policing, and prioritization. Typically, every device on the CMTS requires at least two service flows, one for upstream and one for downstream. However, multiple service flows can be specified to differentiate traffic types. The number of required flows increases as new traffic differentiated services or applications are required.

When devices come online, a set of default service flows are established to carry any unclassified traffic, including registration data, MAC management messages or data PDUs. Once the device registers and its normal service flows become active, traffic is further differentiated through the use of "classifiers" that are tied to each service flow. If traffic does not match any classifiers, it is forwarded on the primary service flow.

Classifiers are the constructs used to tie a particular traffic type to a specific service flow. Classifiers can be applied to either direction, but "downstream" classifiers are applied and processed at the CMTS while "upstream" classifiers are applied and processed at the CM. Classifiers are a set of "matching" criteria applied to each packet entering the cable network. If a packet matches a criteria defined for a service flow, the packet is then delivered to that specific service flow. Classifiers can be set up to match on a variety of parameters such as priority, IP, and LLC parameters. The classifiers are processed based on priority first followed by exact matches of other parameters.

Classifiers may be established based on device-specific values. However, these values must be conveyed to the DTFTP server before the configuration file for the device is generated. Currently, the dynamic creation of configuration files is limited by the information that may be provided to the DTFTP server via the template identifier. Conveying additional information in file names or other strings about the device to be configured increases overhead on the network and on systems that support the provisioning process.

SUMMARY

Embodiments provide systems and methods for providing device-specific data to a DTFTP server in an efficient manner and for using these data to create classifiers for devices dynamically. In other embodiments, systems and methods are provided to distinguish traffic based on the destination of the traffic and to count customer generated CPE traffic, either solicited or unsolicited, while excluding any management traffic to a device through the use of a MAC address classifier.

DETAILED DESCRIPTION

Figure 2:
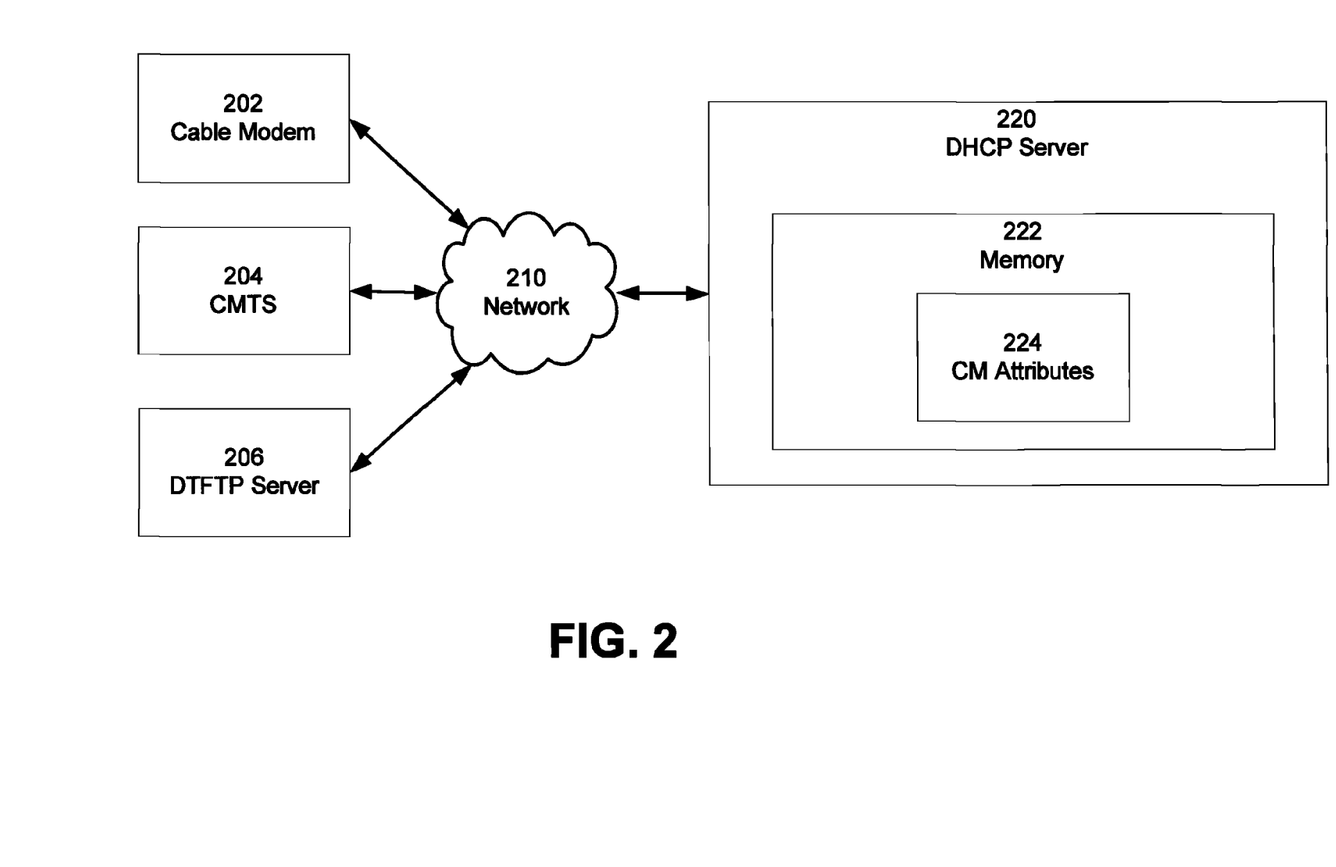
FIG. 2 is a block diagram illustrating components of a provisioning system according to an embodiment.

FIG. 2 is a block diagram illustrating components of a provisioning system according to an embodiment. In this embodiment, the device is a cable modem. However, the process by which the cable modem is provisioned may be applied to other network devices that are provisioned dynamically by cooperation between the device, a DHCP server and a configuration file server.

A cable modem 202 is connected to network 210. The network 210 also provides connectivity to a cable modem termination system (CMTS) 204, a Dynamic Host Configuration Protocol (DHCP) server 202, and a dynamic trivial FTP (DTFTP) server 206.

In an embodiment, the DHCP server 220 is configured to receive DHCP messages from cable mode 202 via network 210. The DHCP server 220 comprises a memory 222. If cable modem 202 successfully registers with the DHCP server 220, the attributes of the cable modem 202 are written to a device attributes record 224 that is stored in memory 222. In an embodiment, the memory 222 is a cache memory and the device attribute record 224 is assigned a configurable "time to live" (TTL). For example, the time period may be selected based on an expected time for the DTFTP server to request information in the attributes record 224. After the expiration of the TTL period, the cache memory is cleared and may be reused for other records. In this way, the size of memory 222 may be kept relatively small.

In an embodiment, the device attributes record 224 comprises a MAC address of the cable modem 202 that is gleaned from the registration request. The device attributes record 224 may also comprise additional information relating to the cable modem 202. By way of illustration and not by way of limitation, the device attributes record 224 may include values retrieved from LDAP.

In an embodiment, the DHCP server 220 generates a key that identifies the attributes record 224 for the cable modem 202. In an embodiment, the key comprises the MAC address of the cable modem 202 and the IP address assigned to the cable modem 202 by the DHCP server 220. However, the key may be any identifier that uniquely identifies the attributes record of the device being configured. A key may be represented in hexadecimal notation and encoded.

Figure 3:
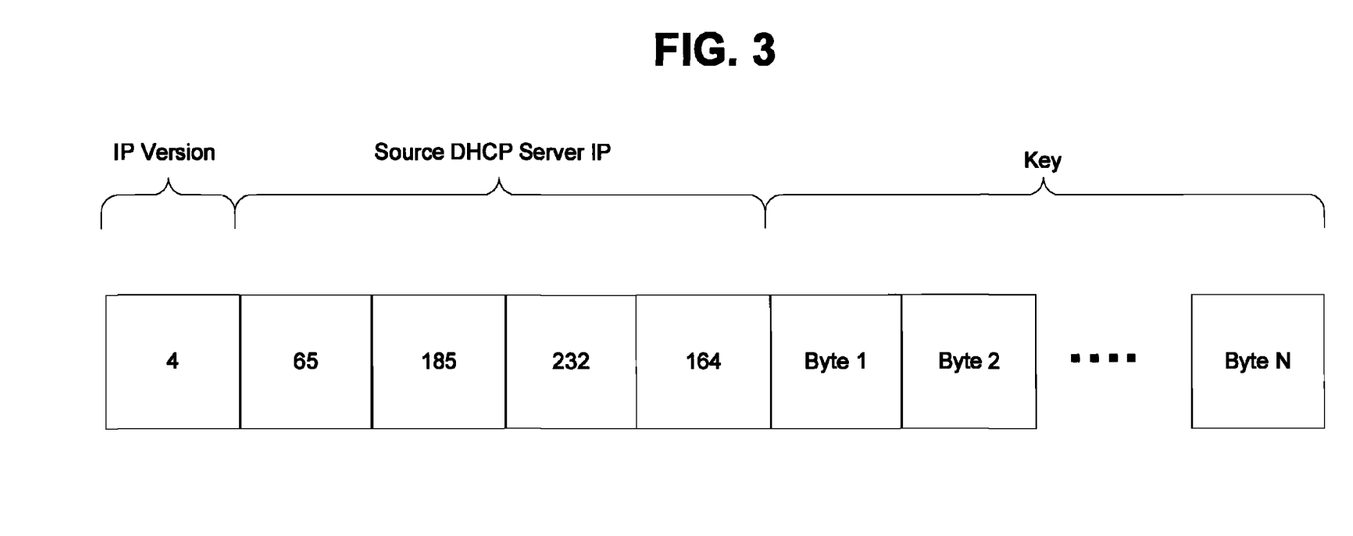
FIG. 3 is a block diagram illustrating a cable modem file name according to an embodiment.

The DHCP server 220 also generates a cable modem file name for the cable modem device. A representation of a cable modem file name is illustrated in FIG. 3. In an embodiment, the boot file name comprises fields to identify an IP version, the source DHCP server IP address, and a key that uniquely identifies the attribute record of the device being configured. By way of illustration and not by way of limitation, the key may be constructed from the MAC address of the cable modem 202 and the IP address assigned to the cable modem 202.

As previously described, the cable modem 202 sends a DHCP discover message that is answered by a DHCP server on the network (see, FIG. 1). In an embodiment, the DHCP server will send the modem the address of a DTFTP server and the cable modem file name to the cable modem in a response to the DHCP discover message. The cable modem 202 then sends the cable modem file name to the DTFTP server in a boot file request message.

The DTFTP server 206 parses the cable modem file name to obtain the IP address of the DHCP server 220 and the key for the attributes record 224. The DTFTP server accesses the attributes record 224 associated with the key and acquires information from the record to dynamically generate a boot file for cable modem 202.

Table 1 illustrates content that may be found in the attributes record 224.

TABLE 1

Attributes Record Content

```
mac => 001018681934
type => cm
dv => 2.0
ldap:
        docsisbootfile => ip10bw10vip1.bin
        docsisisp => isrr
dhcpv4_options:
option 40:
        device:
                model_number => BCM93368VCM
                hardware_version => V1.0
                vendor_ID => 001018
                software_version => 4.4.4alpha5
                boot_ROM_version => 2.2.00
                embedded_components => ECM:EDVA
                vendor_name => Broadcom
                serial_number => 93368VCM-08-14
                device_type => ECM
option 60:
        capabilities:
                fragmentation => true
                multicast_DSIDs => 16
                docsis_version => 2
                IP_filters => 256
                frame_control_type_forwarding_capability => \1
                expanded_unicast_SID_space => true
                LLC_filters => 256
                multicast_DSID_forwarding => 1
                optional_filtering => true
                upstream_SIDs => 16
                number_of_equalizer_taps => 24
                downstream_SAIDs => 15
                IPv6 => true
                payload_header_suppression => true
                privacy => BPI+
                transmit_equalizer_taps_per_symbol => 1
                total_DSIDs => 16
                concatenation => true
                ranging_holdoff => \0\0\0\4
                DCC => true
```

In an embodiment, the boot file includes one or more classifiers. Classifiers are constructs used to tie a particular traffic type to a specific service flow. Classifiers are a set of "matching" criteria applied to each packet entering the cable network. If a packet matches a criteria defined for a service flow, the packet is then delivered to that specific service flow. Classifiers can be set up to match on a variety of parameters found in the attributes record 224. For example, a classifier may be established for devices that have a particular DOCSIS version (for example, 2.x or higher), a particular manufacturer, or a particular model number. The classifiers are processed based on priority first followed by exact matches of other parameters.

In an embodiment, the generated boot file includes at least a MAC classifier. The MAC classifier classifies an incoming downstream packet into a downstream service flow based on the destination MAC address and an outgoing upstream packet into an upstream service flow based on the source MAC address. The classification of the service flow is set up through the modem configuration file. In the downstream direction, the CMTS determines the destination of a packet by looking through its "IP-to-MAC" host table and then queues the packet on the matching MAC classifier flow. If the incoming packet is a multicast or a broadcast packet, the CMTS will not match the MAC classifier flow. In the upstream direction, the cable modem queues a packet based on its source MAC address. When the cable modem generates a packet, the MAC address of the cable modem is used to place the packet on the MAC classifier flow. In an embodiment, the CMTS uses the IP destination IP or the source IP address in a packet to obtain the MAC address of the destination or source device and to identify packets destined for the cable modem and packets originating from the cable modem. In this way, the CMTS may maintain a count of "countable packets" that does not include packet to and from the cable modem as described below.

Figure 4:
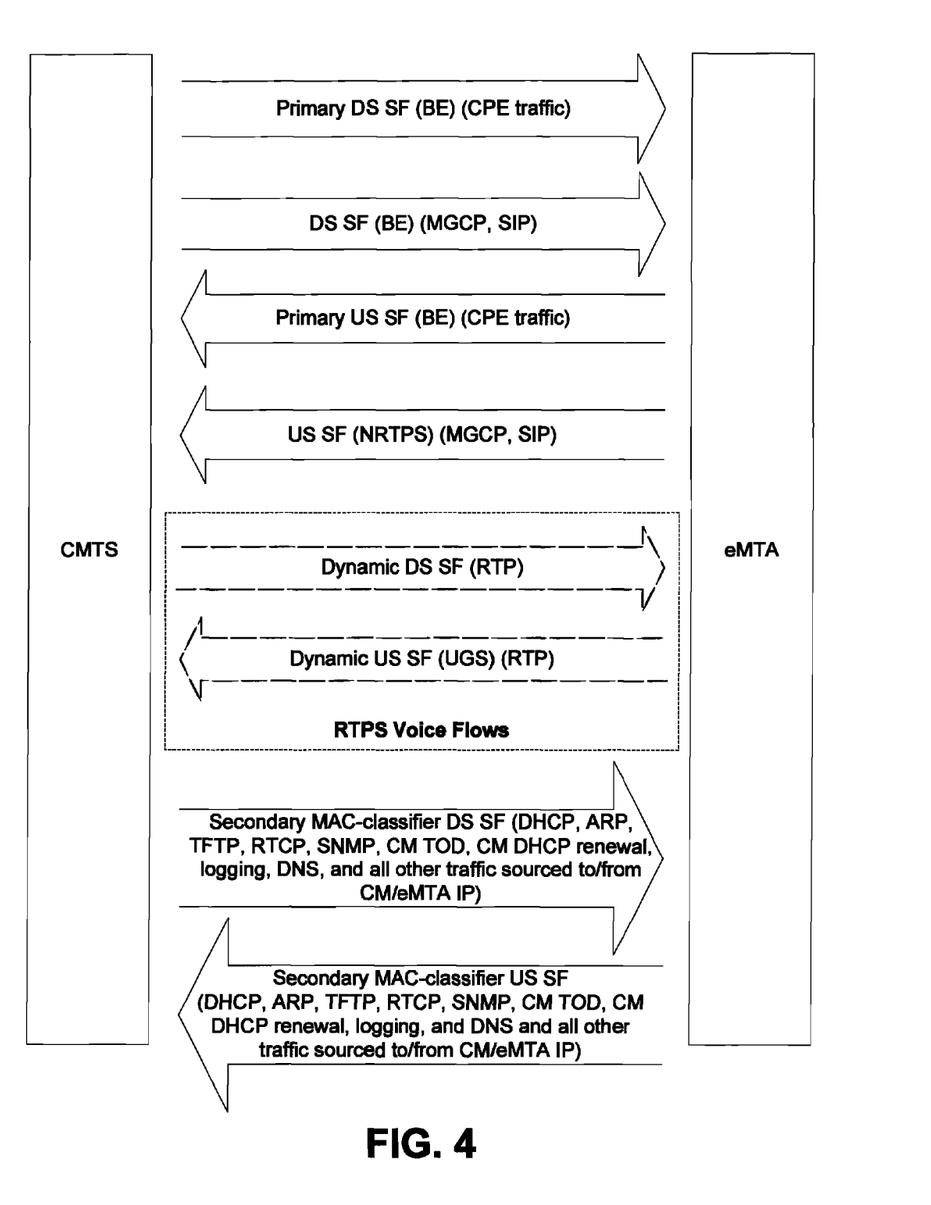
FIG. 4 is a flow diagram illustrating a cable modem configured with classifiers according to an embodiment.

FIG. 4 is a flow diagram illustrating a cable modem configured with classifiers according to an embodiment.

Service flows that are determined by the destination of a packet may be used to distinguish countable traffic from non-countable traffic. "Countable traffic" can be used to enforce policies related to consumption and to establish billing models that are consumption based. By way of illustration and not by way of limitation, a service provider may distinguish packets (downstream packets) that are destined for a device associated with a subscriber (such as a cable modem) from packets directed to other devices associated with a subscriber (such as a computer). Similarly, packets that originate from a subscriber device (upstream packets) may be distinguished from packets that originate from other devices Knowledge of a subscriber's count may be used to facilitate the implementation of network management policies and billing practices. A packet count may be referred to a billing system to determine a subscriber's fee based on that subscriber's consumption. A subscriber's count may also be referred to an enforcement system that implements network policies based on consumption. For example, a subscriber's count may be the basis for reducing bandwidth accessible to the subscriber, changing a priority of packets originating from a subscriber device, and blocking packets originating from a subscriber device.

While the previous description has focused on cable modems, the description is intended to be illustrative and not limiting.

Figure 5:
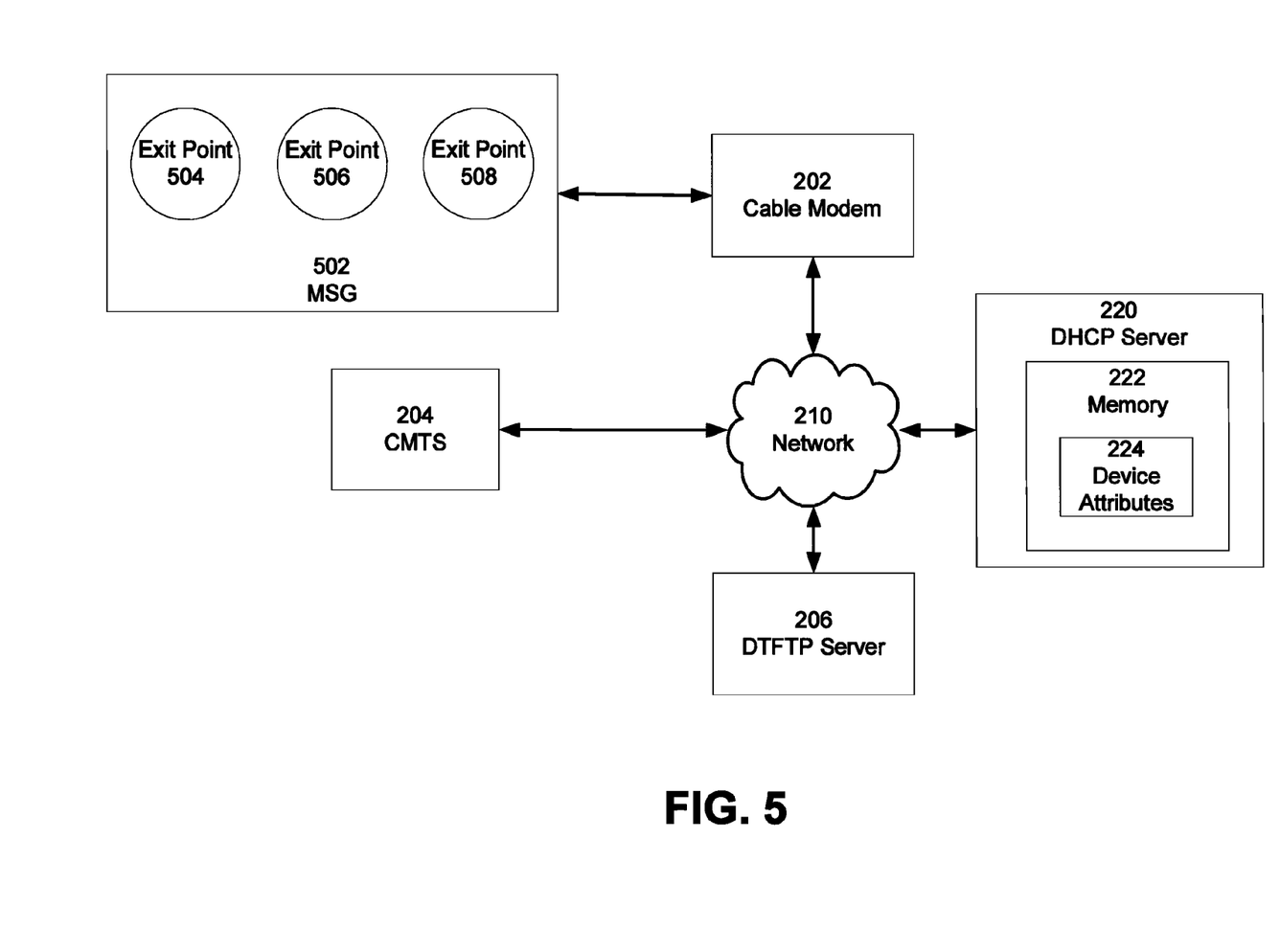
FIG. 5 illustrates a multi-subscriber gateway according to an embodiment.

FIG. 5 illustrates a multi-subscriber gateway according to an embodiment. The network elements 202, 204, 206 and 220 operate as previously described. A multi-subscriber gateway (MSG) 502 comprises multiple logical exit points (circles 504, 506 and 508) that provide connection to a network 210. By way of illustration and not by way of limitation, the MSG 502 may be a wireless gateway and the exit points 504, 506 and 508 may be virtual access points. While only three logical exit points are illustrated in FIG. 5, MSG 502 may be configured with additional exit points.

In an embodiment, the MSG is installed at a subscriber location behind a cable modem 202. One of the logical exit points is assigned to the subscriber. The other exit points may be assigned by the service provider to permit access to the network 210 by other subscribers. For example, where the exit points are virtual access points, the other exit points may be used to support wireless roaming by other subscribers or to support services offered by other service providers. As described previously, under circumstances in which consumption of network resources is monitored on a subscriber basis, it is important to identify the network resources that flow through each of the exit points.

In an embodiment, each of the exit points 504, 506 and 508 of the MSG is assigned a MAC address. A DOCSIS configuration file is constructed, embedding the MAC address of each exit point as a classifier. These classifiers are then used to put traffic from each of the exit points on different service flows as necessary. In so doing, the traffic from the service flow the subscriber is paying for is separated from the traffic carried over the other exit points. The process for assigning service flows to an MSG is similar to that described in reference to a cable modem with the exception that each exit point would request an IP address from the DHCP server.

In an embodiment, each exit point 504, 506 and 508 is associated with a pre-assigned MAC address. In another embodiment, the MAC address is assigned to the exit points on booting of the cable modem to which the MSG is connected. In an embodiment, the MAC addresses are assigned to the exit points in the cable modem DOCSIS configuration file. The cable modem passes the MAC addresses to the MSG.

In an alternative embodiment, the cable modem may provide the number of requested MAC addresses in its provisioning request (via a DHCP option, or perhaps in a DTFTP request) which would allow a backend provisioning system to dynamically assign the proper number of MACs for the MSG. The MAC addresses may be allocated to the MSG during initial provisioning and dynamically allocated based upon pre-determined criteria (CMTS identifier, CM MAC, serial number, etc). If the system generating DOCSIS configuration files is also the same system assigning MAC addresses then it can also define classifiers and flows that match those same MAC addresses.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

An operating environment for the described embodiments may include a processing system with at least one high speed central processing unit ("CPU") or other processing unit and a memory system. The operating environment may be included in a device, computer or server that is used in conjunction with the various embodiments.

It will be appreciated that the acts and symbolically represented operations or instructions include the manipulation of electrical signals by the CPU. An electrical system with data bits causes a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium readable by the CPU or other processing unit. The computer readable medium includes cooperating or interconnected computer readable media, which exist exclusively on the processing system or are distributed among multiple interconnected processing systems that may be local or remote to the processing system.

Further, in view of many embodiments to which the principles of the invention may be applied, it should be understood that the illustrated embodiments are exemplary embodiments and should not limit the present invention as defined by the claims. For example, functionality that has been described in reference to a single device may be applied simultaneously or sequentially to any number of devices. Unless specified to the contrary, the steps of the flow charts may be taken in sequence other than those described, and more, fewer or equivalent elements or components could also be used.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method for generating an attributes record key for a device by a Dynamic Host Configuration Protocol (DHCP) server, comprising:
   receiving a DHCP discover message from the device, wherein the DHCP discover message comprises a medium access control (MAC) address of the device;
   generating at the DHCP server:
      the attributes record key for the device, wherein the attributes record key uniquely identifies a record for the device stored on the DHCP server; and
      a device file name for the device, wherein the device file name comprises an IP address of the DHCP server and the attributes record key of the device;
   sending the device file name and an Internet Protocol (IP) address of a Dynamic Trivial File Transfer Protocol (DTFTP) server to the device;
   receiving a request for an attribute record of the device from the DTFTP server, wherein the request includes the attributes record key for the device; and
   providing the attribute record of the device to the DTFTP server.

2. The method of claim 1 wherein the device is selected from the group consisting of a cable modem and a multi-subscriber gateway.

3. The method of claim 1, wherein the attributes record key comprises the MAC address of the device and an IP address assigned to the device by the DHCP server.

4. A Dynamic Host Configuration Protocol (DHCP) server for generating an attributes record key for a device, comprising:
   a processor, wherein the processor is configured with software executable instructions to cause the DHCP server to perform operations comprising:

receiving a DHCP discover message from the device, wherein the DHCP discover message comprises a medium access control (MAC) address of the device;

generating the attributes record key for the device, wherein the attributes record key uniquely identifies a record for the device stored on the DHCP server;

generating a device file name for the device, wherein the device file name comprises an IP address of the DHCP server and the attributes record key of the device;

sending the device file name and an Internet Protocol (IP) address of a Dynamic Trivial File Transfer Protocol (DTFTP) server to the device;

receiving a request for an attribute record of the device from the DTFTP server, wherein the request includes the attributes record key for the device; and providing the attribute record of the device to the DTFTP server.

5. The DHCP server of claim 4, wherein the device is selected from the group consisting of a cable modem and a multi-subscriber gateway.

6. The DHCP server of claim 4, wherein the attributes record key comprises the MAC address of the device and an IP address assigned to the device by the DHCP server.

7. A method for assigning a service flow classifier to a device by a Dynamic Trivial File Transfer Protocol (DTFTP) server, comprising:

receiving, from the device, a device file name in a boot file request message, wherein the device file name comprises an Internet Protocol (IP) address of a Dynamic Host Configuration Protocol (DHCP) server and an attributes record key of the device that uniquely identifies a record for the device stored on the DHCP server;

accessing an attribute record of the device stored on the DHCP server using the IP address of the DHCP server and the attributes record key for the device;

generating a boot file for the device, wherein the boot file comprises one or more service flow classifiers; and sending the boot file to the device.

8. The method of claim 7, wherein one of the one or more service flow classifiers classifies an incoming downstream packet into a service flow identified by a medium access control (MAC) address of the device.

9. The method of claim 7, wherein the device is selected from the group consisting of a cable modem and a multi-subscriber gateway.

10. The method of claim 7, further comprising associating the device and another device with a subscriber, wherein the one or more service flow classifiers are associated with one or more service flows that comprises a first service flow for packets that are destined to the device and a second service flow for packets that are destined for the other device.

11. The method of claim 10, further comprising:

queuing a packet destined for the device on the first service flow;

queuing a packet destined for the other device on the second service flow;

counting the packets queued on the second service flow during a time interval; and associating the count with the subscriber.

12. The method of claim 11, further comprising billing the subscriber based on the count.

13. The method of claim 11, further comprising applying a policy to the subscriber based on the count.

14. The method of claim 13, wherein the policy is selected from the group consisting of reducing bandwidth accessible to the subscriber, changing a priority of packets originating from the other device, and blocking packets originating from the other device.

15. The method of claim 7, wherein the attributes record key comprises a MAC address of the device and an IP address assigned to the device by the DHCP server.

16. A Dynamic Trivial File Transfer Protocol (DTFTP) server for assigning a service flow classifier to a device, comprising:

a processor, wherein the processor is configured with software executable instructions to cause the DTFTP server to perform operations comprising:

receiving, from the device, a device file name in a boot file request message, wherein the device file name comprises an Internet Protocol (IP) address of a Dynamic Host Configuration Protocol (DHCP) server and an attributes record key of the device that uniquely identifies a record for the device stored on the DHCP server;

accessing an attribute record of the device stored on the DHCP server using the IP address of the DHCP server and the attributes record key for the device;

generating a boot file for the device, wherein the boot file comprises one or more service flow classifiers; and sending the boot file to the device.

17. The DTFTP server of claim 16, wherein one of the one or more service flow classifiers classifies an incoming downstream packet into a service flow identified by a medium access control (MAC) address of the device.

18. The DTFTP server of claim 16, wherein the device is selected from the group consisting of a cable modem and a multi-subscriber gateway.

19. The DTFTP server of claim 16, wherein the processor is configured with software executable instructions to cause the DTFTP server to perform operations further comprising:

associating the device and another device with a subscriber, wherein the one or more service flow classifiers are associated with one or more service flows that comprises a first service flow for packets that are destined to the device and a second service flow for packets that are destined for the other device.

20. The DTFTP server of claim 19, wherein the processor is configured with software executable instructions to cause the DTFTP server to perform operations further comprising:

queuing a packet destined for the device on the first service flow;

queuing a packet destined for the other device on the second service flow;

counting the packets queued on the second service flow during a time interval; and associating the count with the subscriber.

21. The DTFTP server of claim 20, wherein the processor is configured with software executable instructions to cause the DTFTP server to perform operations further comprising billing the subscriber based on the count.

22. The DTFTP server of claim 20, wherein the processor is configured with software executable instructions to cause the DTFTP server to perform operations further comprising applying a policy to the subscriber based on the count.

23. The DTFTP server of claim 22, wherein the policy is selected from the group consisting of reducing bandwidth accessible to the subscriber, changing a priority of packets originating from the other device, and blocking packets originating from the other device.

24. The DTFTP server of claim 16, wherein the attributes record key comprises a MAC address of the device and an IP address assigned to the device by the DHCP server.

25. A method for assigning a service flow classifier to a device comprising:
   sending a Dynamic Host Configuration Protocol (DHCP) discover message to a DHCP server, wherein the DHCP discover message comprises a medium access control (MAC) address of the device;
   receiving a device file name and an IP address of a Dynamic Trivial File Transfer Protocol (DTFTP) server, wherein the device file name comprises an Internet Protocol (IP) address of the DHCP server and an attributes record key of the device that uniquely identifies a record for the device stored on the DHCP server;
   sending the device file name in a boot file request message to the DTFTP server using the IP address of the DTFTP server;
   receiving a boot file from the DTFTP server, wherein the boot file comprises one or more service flow classifiers; and
   configuring the device with the one or more service flow classifiers.

26. The method of claim 25, wherein one of the one or more service flow classifiers classifies an incoming downstream packet into a service flow identified by the MAC address of the device.

27. The method of claim 25, wherein the device is selected from the group consisting of a cable modem and a multi-subscriber gateway.

28. The method of claim 25, wherein the attributes record key comprises the MAC address of the device and an IP address assigned to the device by the DHCP server.

29. A device, comprising:
   a processor, wherein the processor is configured with software executable instructions to cause the device to perform operations comprising:
      sending a Dynamic Host Configuration Protocol (DHCP) discover message to a DHCP server, wherein the DHCP discover message comprises a medium access control (MAC) address of the device;
      receiving a device file name and an IP address of a Dynamic Trivial File Transfer Protocol (DTFTP) server, wherein the device file name comprises an Internet Protocol (IP) address of the DHCP server and an attributes record key of the device that uniquely identifies a record for the device stored on the DHCP server;
      sending the device file name in a boot file request message to the DTFTP server using the IP address of the DTFTP server;
      receiving a boot file from the DTFTP server, wherein the boot file comprises one or more service flow classifiers; and
      configuring the device with the one or more service flow classifiers.

30. The device of claim 29, wherein one of the one or more service flow classifiers classifies an incoming downstream packet into a service flow identified by the MAC address of the device.

31. The device of claim 29, wherein the device is selected from the group consisting of a cable modem and a multi-subscriber gateway.

32. The device of claim 29, wherein the attributes record key comprises the MAC address of the device and an IP address assigned to the device by the DHCP server.

* * * * *